United States Patent
Wilcosky

(10) Patent No.: US 6,259,981 B1
(45) Date of Patent: Jul. 10, 2001

(54) CAUTION/WARNING SYSTEM FOR DISPLAYING SYSTEM MALFUNCTIONS/FAULTS IN A NIGHT-TIME VIEWING MODE

(76) Inventor: Thomas J. Wilcosky, 808 Dogwood Dr., Washington, IL (US) 61571

( * ) Notice: Subject to any disclaimer, the term of this patent is extended or adjusted under 35 U.S.C. 154(b) by 0 days.

(21) Appl. No.: 09/334,963

(22) Filed: Jun. 17, 1999

(51) Int. Cl.[7] .................................................. G06F 19/00
(52) U.S. Cl. .............................. 701/29; 701/34; 340/459; 340/461
(58) Field of Search .................................. 701/29, 30, 34; 340/500, 459, 461, 462

(56) References Cited

U.S. PATENT DOCUMENTS

| | | | |
|---|---|---|---|
| 4,497,057 | 1/1985 | Kato et al. | 371/29 |
| 4,896,276 | 1/1990 | Saglimbeni et al. | 364/550 |
| 5,034,894 | 7/1991 | Abe | 364/431.01 |
| 5,176,027 | 1/1993 | Umemoto | 73/118.1 |
| 5,369,581 | 11/1994 | Ohsuga et al. | 364/424.01 |
| 5,371,487 | 12/1994 | Hoffman et al. | 340/425.5 |
| 5,420,977 | 5/1995 | Sztipanovits | 395/160 |
| 5,432,497 | 7/1995 | Briski et al. | 340/525 |
| 5,453,939 | 9/1995 | Hoffman et al. | 364/551.01 |
| 5,544,055 | 8/1996 | Cooper | 364/424.07 |
| 5,600,558 | 2/1997 | Mearek et al. | 364/424.04 |
| 5,857,159 | 1/1999 | Dickrell et al. | 701/35 |

*Primary Examiner*—William A. Cuchlinski, Jr.
*Assistant Examiner*—Yonel Beaulieu

(57) ABSTRACT

Apparatuses and methods for indicating abnormal conditions associated with certain parameters related to the operation of a vehicle or marine vessel during a night-time viewing mode. A plurality of sensors sense a plurality of parameter levels and responsively produce a plurality of sensor signals indicative of the different levels of An electronic controller is coupled to the sensors for receiving signals therefrom. A display or indicator mechanism displays normal or abnormal conditions associated with a sensed parameter when the level of a sensed parameter is equal to a predetermined level. The controller displays on the display or indicator mechanism a warning to the operator indicative of an abnormal condition associated with any one of the sensed parameters. The controller increases the illumination level of the warning given to the operator when the display or indicator mechanism is being operated in a night-time viewing mode.

24 Claims, 4 Drawing Sheets

CAUTION/WARNING SYSTEM FOR DISPLAYING SYSTEM MALFUNCTIONS/ FAULTS IN A NIGHT-TIME VIEWING MODE

TECHNICAL FIELD

This invention relates generally to a monitoring system for detecting and displaying certain system malfunctions/faults associated with a particular vehicle or marine vessel and, more particularly, to a caution/warning system which is operable when the monitoring system is being operated in a night-time viewing mode.

BACKGROUND ART

In a variety of engine-powered vehicles including ground vehicles, aircraft and marine vessels, monitoring and diagnostic systems are typically employed to detect the presence of various undesirable operating conditions such as overheating or overspeeding the engine, low or high oil pressure, low or high fuel pressure, high oil temperature and the like. These monitoring and diagnostic systems also typically include instruments, gauges, indicators, or other caution/warning devices which are used to warn the operator of such conditions. These instruments, gauges or other devices are typically connected to various sensors, switches and other control apparatus for monitoring and/or controlling various systems and conditions associated with the particular vehicle or vessel via a wiring harness, one or more electronic control systems, and/or a communications data link. Depending upon the particular monitoring and/or diagnostic system associated with a particular vehicle or vessel, vital vehicle/vessel functions are monitored and various levels of sensed parameters are displayed on various gauges and/or other indicator displays. When a malfunction or fault, or an impending malfunction or fault, is detected, such malfunction/fault or a corresponding condition indicative of such malfunction/fault is brought to the attention of the operator by any one of a plurality of visual warning mechanisms such as by illuminating a warning light or caution panel, by flashing an indicator light, or by flashing a particular gauge. These visual mechanisms are more than adequate when operating in a day-time viewing mode.

Today, many of the present monitoring and diagnostic systems include multi-colored LCD or CRT screens wherein operation of a particular system outside normal operating limits will be displayed in accordance with a particular color code. For example, many gauges will include a green area for indicating the normal operating range of a particular system parameter, a yellow area for indicating a caution zone, and a red area for indicating a warning zone. In a multi-colored LCD or CRT monitoring system, operation of a particular vehicle function outside of normal limits may trigger or illuminate a yellow display when the particular parameter system or gauge is operating in a caution zone, and such monitoring system may trigger or illuminate a red display when the particular system parameter or gauge is operating in a warning zone. Other colors are likewise utilized in association with such monitoring/warning systems to catch the attention of the operator during normal day-light hours.

The brightness and intensity associated with the known LCD/CRT screens, or other monitoring/warning systems incorporated into motor vehicles, aircraft, and marine vessels is predicated upon day-time usage and, as a result, such illumination is normally too bright to maintain normal night-time vision during night-time operations. Visual references and depth perception change with night operations. Distances and rates of closure are more difficult to judge and visual references are more limited. Refraction and reflection of gauge and screen lighting off of the windshield, glare shield, canopy or other viewing medium may induce false indications as to objects observed and their relative position and distance from the vehicle or vessel. Such glare also detracts from the operator's night-time viewing and scanning capability and inhibits night vision. This decrease in visual effectiveness at night is minimized by reducing the brightness and intensity of any instrumentation and other operator lighting to provide minimum screen glare or reflection yet still allow adequate gauge and/or other instrument reading and interpretation.

As a result, most known monitoring/warning systems will include some mechanism for either manually or automatically dimming the system. For example, some systems include a night-time viewing mode switch or dimming switch so that the brightness and intensity of the caution and warning panel, or the operator interface display screen, can be adequately dimmed to such a level that the illumination of such system will not interfere with night-time vision. In addition, often times the night-time viewing mode of any particular caution/warning system will effectively eliminate the multi-colored caution/warning displays associated with such system as most night-time operating modes will utilize a monochrome red background for all viewing displays. As a result, due to the dimness of the display screen and elimination and/or reduction of the colored caution/warning displays, illuminated malfunction or fault conditions during night-time operations may be easily ignored due to the low light illumination of such displays when such systems are operating in a night-time viewing mode.

It is therefore desirable to provide a warning system which will catch the eye of the operator when a system malfunction, fault or abnormality is illuminated while the monitoring system is operating in a night-time viewing mode.

Accordingly, the present invention is directed to overcoming one or more of the problems as set forth above.

SUMMARY OF THE INVENTION

The present invention provide apparatus and methods for indicating various levels of sensed parameters, warning conditions, and/or fault conditions on a particular vehicle or marine vessel having an instrument/gauge panel or some other vehicle/vessel system performance display means. Such a system will include a plurality of sensors coupled to an electronic controller in a particular manner such that sensor signals inputted to the controller will be indicative of the level of the sensed parameter and such sensed parameters will be displayed to the operator via an operator interface display screen which may display a plurality of gauges, and/or a plurality of caution/warning indicators, and/or other system or performance indicators. If a sensed system parameter is outside of its normal operating limits, a caution/warning or abnormal/fault condition will be visually displayed in some manner to the operator on the operator interface display screen.

In one aspect of the present invention, when the monitoring/warning system is being operated in a night-time viewing mode, and a caution/warning or fault condition is displayed on the operator interface display screen, if the operator of the particular vehicle/vessel does not see or ignores the warning/fault condition for a predetermined period of time, an electronic controller associated with the operator interface display screen is programmed to output a signal to the operator interface display screen, or to some other caution/warning indicator means, to increase the brightness and intensity of such screen or other caution/warning indicator means so as to catch the attention of the operator. This increase in the overall brightness of the operator interface display screen or other indicator means serves as an additional warning to the operator that a malfunction/fault condition exists and that operator intervention is required. Once some type of predetermined operator intervention is recognized by the electronic controller, the brightness or intensity of the operator interface display screen or other caution/warning indicator means will be returned to its normal night-time viewing mode. Recognition of some type of operator intervention with respect to a displayed caution/warning condition can include taking appropriate corrective action based upon the malfunction/fault condition, or such recognition may include merely activating a switch, or touching a touch sensitive LCD screen to acknowledge that the displayed caution/warning condition has been observed.

BRIEF DESCRIPTION OF THE DRAWINGS

For better understanding of the present invention, reference may be made to the accompanied drawings in which.

BEST MODE FOR CARRYING OUT THE INVENTION

Figure 1:
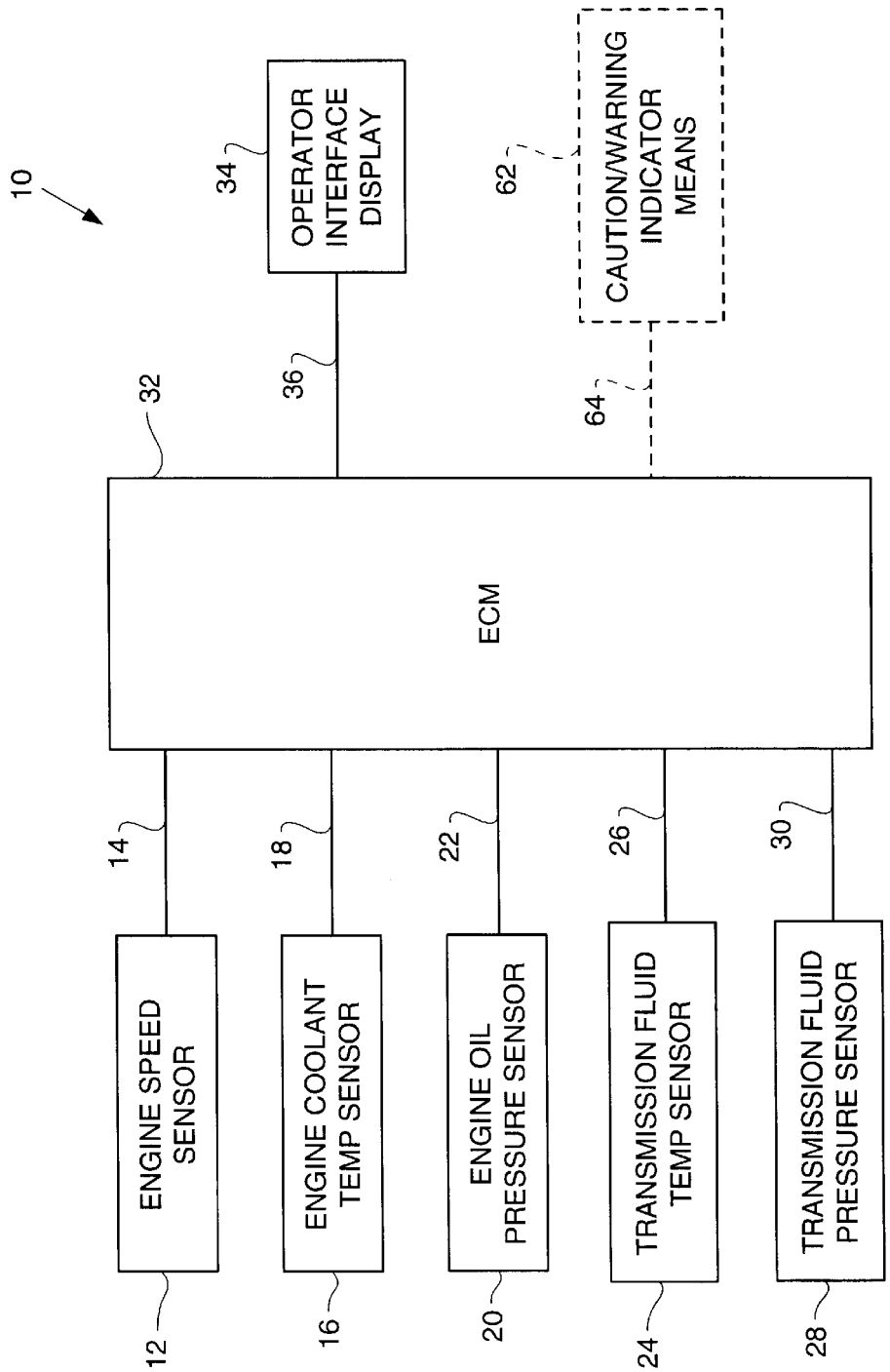
FIG. 1 is a schematic diagram of a monitoring/warning system according to one embodiment of the invention which may be utilized in conjunction with a wide variety of different types of engine-powered vehicles and marine vessels.

Referring to FIG. 1, numeral 10 in FIG. 1 represents a schematic diagram of a monitoring/warning system according to one embodiment of the invention which may be utilized in conjunction with a wide variety of different types of engine-powered vehicles including marine vessels. The caution/warning system 10 includes a plurality of sensors 12, 16, 20, 24 and 28 which monitor certain vehicle functions, all of which sensors provide input signals to an electronic control module (ECM) 32. Typically, the electronic control module 32 will be associated with an engine (not shown) and will control fuel delivery to the engine, among other functions. Based upon the input signals from sensors 12, 16, 20, 24 and 28, ECM 32 will output signals to a typical operator interface display 34 for indicating and displaying various levels of the sensed parameters monitored by the various sensors. In one embodiment, based upon these sensed parameters, ECM 32 will also output appropriate signals indicating and displaying any caution/warning condition, and/or malfunction/fault condition associated with any of the systems and parameters being monitored by the various sensors when the level of any sensed parameter is equal to or approaches a predetermined level for that particular parameter. In another embodiment, the ECM may transmit raw data or appropriate signals to an electronic controller associated with the operator interface display 34. In the embodiment shown in FIG. 1, the ECM 32 controls the operator interface display. However, those skilled in the art will recognize that the operator interface display may include a dedicated controller to perform display functions, including interfacing with the ECM 32. Throughout the remainder of this specification, the invention will be described with reference to a single ECM 32, including an electronic controller. However, the present invention includes those applications where the operator interface display 34 includes an electronic controller. The software control described hereinafter can be performed in the ECM 32 or an electronic controller associated with the operator interface controller or, where appropriate, both such controllers. Reference herein to ECM 32 shall include all such embodiments.

Electronic controllers or modules such as ECM 32 are commonly used in association with engine-powered vehicles and marine vessels for controlling and accomplishing various functions and tasks including monitoring and displaying through a caution/warning system such as system 10 various engine and other vehicle/vessel functions. In this regard, ECM 32 will typically include processing means, such as a microcontroller or microprocessor, associated electronic circuitry such as input/output circuitry, analog circuits or programmed logic arrays, as well as associated memory. ECM 32 can therefore be programmed to sense and recognize appropriate signals from input sensors 12, 16, 20, 24 and 28 indicative of certain conditions or parameters as will be hereinafter explained, and thereafter provide appropriate output signals to display the level of the sensed parameters to the operator via operator interface display 34, or other equivalent means, and control the brightness of the operator interface display 34. As described above, in another embodiment, an electronic controller associated with the operator interface display 34 and the ECM electronic controller will control the brightness of the operator interface display 34.

The caution/warning system 10 illustrated in FIG. 1 includes an engine speed sensor 12 which is coupled to ECM 32 via conductive path 14 for constantly delivering engine speed indicative signals to ECM 32 during the operation of the particular vehicle or vessel. The engine speed sensor 12 constantly senses and monitors the engine speed and provides such information to ECM 32 for monitoring and display to the vehicle/vessel operator on operator interface 34 via conductive path 36.

In similar fashion, an engine coolant temperature sensor 16 is coupled to ECM 32 via conductive path 18 for constantly delivering engine coolant temperature indicative signals to ECM 32 during the operation of the vehicle/vessel engine; an engine oil pressure sensor 20 is coupled to ECM 32 via conductive path 22 for constantly delivering engine oil pressure indicative signals to ECM 32 during the operation of the vehicle/vessel engine; a transmission fluid temperature sensor 24 is coupled to ECM 32 via conductive path 26 for constantly delivering transmission fluid temperature indicative signals to ECM 32 during the operation of the vehicle/vessel; and a transmission fluid pressure sensor 28 is coupled to ECM 32 via conductive path 30 for constantly delivering transmission fluid pressure indicative signals to ECM 32 during the operation of the vehicle/vessel. These sensors likewise constantly sense and monitor corresponding vehicle/vessel parameters such as engine temperature, engine oil pressure, transmission fluid temperature and transmission fluid pressure, and such sensors provide this information to ECM 32 for display onto operator interface display 34 via conductive path 36.

All of the above-identified sensors 12, 16, 20, 24 and 28 are well known in the art and are commonly used to continuously monitor and sense these types of engine and transmission parameters. Persons skilled in the art are familiar with a wide variety of different types of sensors which may be utilized to monitor and sense engine speed, engine coolant temperature, transmission fluid temperature and pressure, and a wide variety of other vehicle/vessel parameters. In this regard, the caution/warning system 10 illustrated in FIG. 1 is provided for illustrative purposes only and it is recognized and anticipated that a wide variety of other vehicle/vessel parameters and functions are typically monitored by such monitoring/warning and diagnostic systems. For example, other sensed parameters or vehicle/vessel functions which can be monitored and displayed by such systems may include fuel pressure, fuel temperature, fuel injector activation pressure, inlet manifold pressure, inlet manifold temperature, turbo boost pressure, engine oil temperature, and still other parameters. Here again, a wide variety of sensors are well known in the art and commonly used to monitor and display these types of parameters as well as many others.

Figure 2:
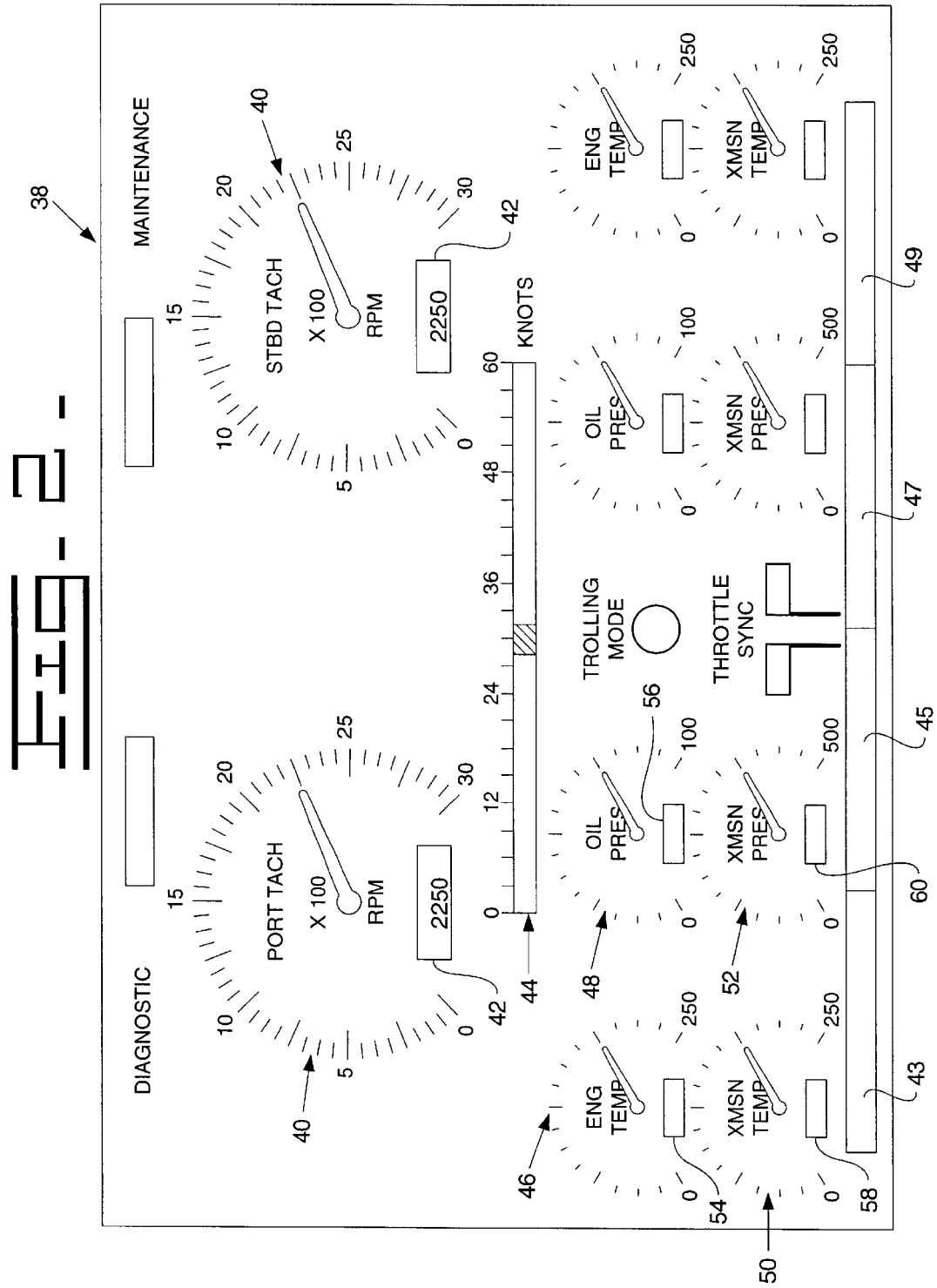
FIG. 2 is an illustration of a computerized diagnostic and monitoring system according to one embodiment of the invention for a marine vessel functioning in a normal display mode.

FIG. 2 illustrates a operator interface display screen 38 according to one embodiment of the invention associated with a monitoring/warning system used for electronically controlled marine engines. The operator interface display screen 38 displays current engine and transmission data and includes touch screen technology which provides fast, easy access to additional vessel information such as trip data, historical data, maintenance and diagnostic information, and trouble shooting information. This additional information can be accessed by touching any one of a plurality of function keys mounted on the system housing below the display screen 38 such as the function keys 43, 45, 47 and 49. The system 10 can also interface with vessel global positioning systems to display vessel position and speed on other screen displays. Although display screen 38 (FIG. 2) is shown as simultaneously displaying data for two marine engines, it is recognized and anticipated that a single screen display such as screen 38 can simultaneously display data for any plurality of engines. In this regard, the ECM associated with each respective engine, such as ECM 32 illustrated in FIG. 1, would be separately connected to the operator interface display 34 via a conductive path such as conductive path 36 or via a data link, or via some other type of electrical or communications link. The operator interface display system 34 as well as screen 38 function in response to internal software associated with ECM 32.

The display screen 38 is typically a high resolution, multi-colored LCD screen which provides good readability in all lighting conditions. A function key, button or switch for controlling the illumination and intensity of the screen 38 is also typically associated with the overall caution/warning system. As illustrated in FIG. 2, the respective sensor signals 14, 18, 22, 26 and 30 inputted to ECM 32 indicative of the level of the sensed parameters will be displayed on screen 38 via conductive path 36 in a format such as that illustrated in FIG. 2. For example, screen display 38 displays engine and vessel information in a gauge format using a combination analog, digital and bar gauge configuration. More particularly, data from the engine speed sensor 12 is displayed via an analog tachometer 40 with the RPM also being digitally displayed in window 42 for each engine. Vessel speed is displayed on bar gauge 44; data from the engine coolant temperature sensor 16 is displayed in analog format on gauge 46 and digital format on window 54; data from the engine oil pressure sensor 20 is displayed in both analog format on gauge 48 and digital format on window 56; data from the transmission fluid temperature sensor 24 is displayed in both analog format on gauge 50 and digital format on window 58; and the data from the transmission fluid pressure sensor 28 is likewise displayed in both analog format or gauge 52 and a digital format on window 60. As previously explained, data from other sensors indicative of other system parameters as well as other instrument/gauge representations can be displayed on screen 38.

When the caution/warning system 10 is being operated in its normal day-time viewing mode, the outside of each respective gauge face such as the gauges 40, 46, 48, 50 and 52 (FIG. 2) will typically include a green area or arc that indicates the normal operating range for that particular gauge parameter, a yellow area or arc for indicating a caution zone for that particular gauge parameter, and a red area or arc for indicating a warning zone outside the normal operating range. Below each gauge is a window which displays the digital value of that particular system parameter such as the windows 42 54, 56, 58 and 60. Software associated with ECM 32 will evaluate inputs from each of the respective sensors 12, 16, 20, 24 and 28 and will determine if the level of the respective sensed parameter for that particular sensor is within or outside of normal operating limitations, or is less than, equal to, or greater than some predetermined level. When a sensed parameter is within normal operating limits, ECM 32 will output a signal to the operator interface display 34 such that the gauge needle associated with that particular sensed parameter will indicate its appropriate level in the normal operating range, and the corresponding digital readout will appear in white letters with a black background.

If ECM 32 determines that the sensed parameter is equal to a predetermined level, or is within a predetermined range associated with a caution zone for that particular parameter, ECM 32 will output appropriate signals such that the corresponding gauge needle will indicate its appropriate level in the yellow caution zone and the digital readout will appear in black characters with a yellow background. This yellow color coding functions as a warning to the operator that a sensed parameter is about to go outside of its normal operating limits. For example, in the case of the oil pressure gauge 48, the gauge needle extending into the yellow caution zone and the digital readout appearing with a yellow background is a visual indication and warning to the operator that either a high or low oil pressure limit is about to be reached.

In similar fashion, ECM 32 is programmed to output appropriate signals to the operator interface display 34 via conductive path 36 to likewise indicate when a sensed parameter has either reached or exceeded a predetermined level or particular limitation associated with a warning or malfunction zone for that particular parameter. In this situation, the gauge needle will indicate the appropriate level in the red warning zone and the digital readout associated with that particular gauge will appear in black letters with a red background. In the case of the oil pressure gauge 48, this red color coding will again be a visible warning to the operator that either a low or high oil pressure limit has been reached. In some situations, depending upon the particular caution/warning system being utilized, ECM 32 may likewise be programmed to illuminate the words WARNING and identify the particular fault or malfunction inside the gauge face or in close proximity thereto, or such cautions and/or warning descriptions may be illuminated on a separate caution/warning panel. For example, in the case of low oil pressure, the words WARNING LOW OIL PRESSURE would appear at the appropriate location on screen 38, or in association with a corresponding caution/warning panel. In this instance, illumination of a caution/warning panel or other caution/warning indicator means such as a warning light may be in conjunction with the caution/warning displays just discussed with respect to screen 38 of FIG. 2, or such caution/warning indicator means may be separate and apart from screen 38 such as the caution/warning indicator means 62 illustrated in dotted outline form in FIG. 1. In this situation, ECM 32 could output a signal via conductive path 64 directly to indicator means 62 separate and apart from the operator interface display 34.

Although the operator interface display 34 and/or caution/warning indicator means 62 provide a visually attractive and readily readable appearance to the operator during normal day-time operations, for all of the reasons discussed above, when the operator interface display 34 functions in a night-time viewing mode, the caution and warning displays discussed above, including the color coding associated therewith, become hard to read and may be missed or ignored during night-time operations. As a result, the illumination of any caution/warning indicator means on screen 38, or else where, is difficult to read for the reasons previously explained including the fact that the screen 38 will typically appear in a monochrome red color only in the night-time viewing mode and none of the associated caution/warning colors will be easily discernable.

In accordance with the teachings of the present invention, if a caution/warning condition is displayed on the operator interface display 34 while the system 10 is being operated in a night-time viewing mode, the intensity and brightness of the interface display screen 38 will be increased as will be hereinafter further explained so as to catch the attention of the vehicle/vessel operator. An example of operation in accordance with one aspect of the present invention is set forth in the flow chart illustrated in FIG. 3, and an example of operation in accordance with another aspect of the present invention is illustrated in FIG. 4. The operating steps as set forth in control loops 66 or 82 can be incorporated into the programming of the processing means of ECM 32 by techniques well known to those of ordinary skill in the art.

Figure 3:
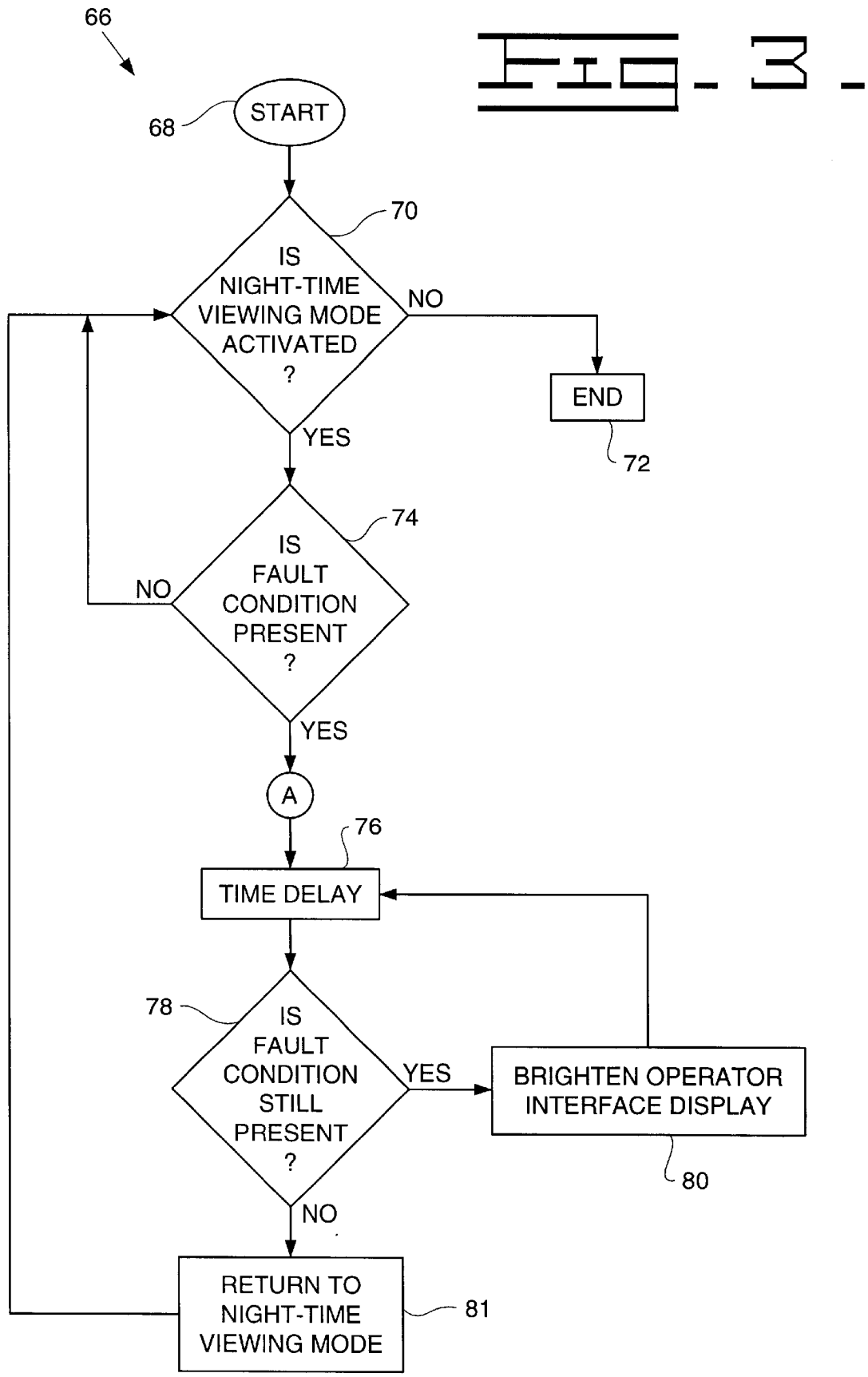
FIG. 3 is a flow chart of the operating steps for a warning system constructed in accordance with the teachings of one embodiment of the present invention.
Figure 4:
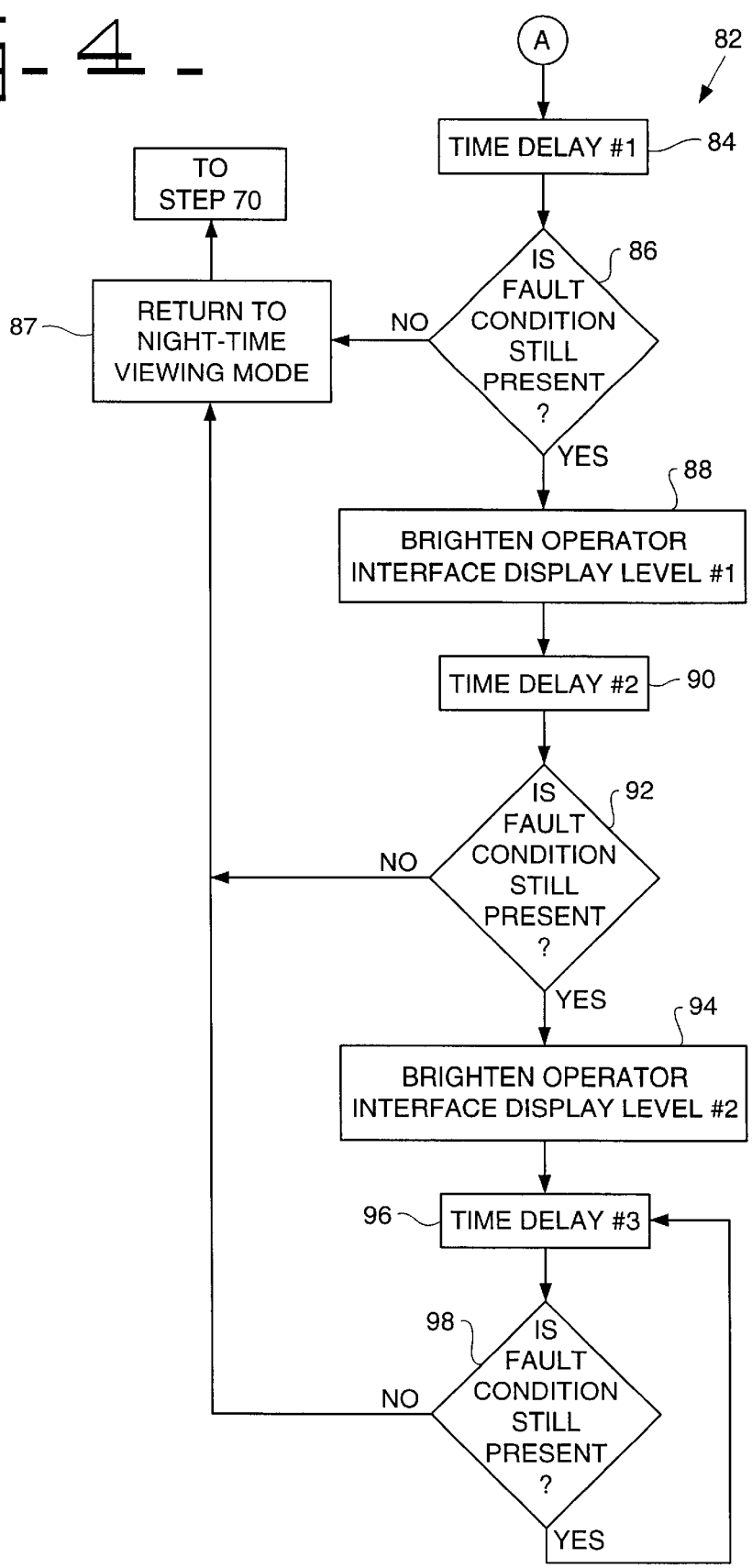
FIG. 4 is a flow chart of the operating steps for a warning system constructed in accordance with the teachings of another embodiment of the present invention.

Referring to FIG. 3, once control loop 66 is initiated at step 68, ECM 32 will look to see if the night-time viewing mode associated with the caution/warning system 10 has been activated at step 70. If the caution/warning system 10 is not operating in its night-time mode, that is, if the illumination level of the system display means has not been dimmed in any fashion from the normal day-time illumination level, control loop 66 will terminate at step 72. On the other hand, if the night-time viewing mode has been initiated by the operator of the vehicle/vessel, ECM 32, at step 74, will then look to see if any abnormal or malfunction/fault condition is present and displayed on the operator interface display 34, or on some other equivalent caution/warning indicator means. A level of any sensed parameter operating in the caution or warning zone is normally considered an abnormal or malfunction/fault condition. If no abnormal or malfunction/fault condition is displayed at step 74, ECM 32 will loop back to step 70 and repeat the process until an undesirable condition does occur.

If, on the other hand, at step 74, ECM 32 determines that a malfunction/fault condition is displayed on the operator interface display screen 38, ECM 32 will, at step 76, wait a predetermined period of time, such as one minute, and then again look to see if the malfunction/fault condition is still being displayed or is present at step 78.

If, at step 78, the malfunction/fault condition is no longer being displayed on screen 38, ECM 32 will loop back to step 70 and repeat control loop 66. If, on the other hand, at step 78, ECM 32 determines that the malfunction/fault condition is still present and is still being displayed on interface screen 38, and if ECM 32 also determines that no predetermined operator intervention has occurred, ECM 32 will output appropriate signals to automatically brighten the display screen 38 at step 80. Once the illumination level of the display screen 38 has been increased at step 80, ECM 32 will loop back to step 76 and again wait a predetermined period of time before repeating step 78. ECM 32 will continuously repeat steps 76, 78 and 80 until the abnormal or malfunction/fault condition is no longer present, or until some predetermined action has been taken by the operator of the particular vehicle/vessel. In this regard, it is recognized and anticipated that ECM 32 could be programmed to recognize a wide variety of different responses by the vehicle/vessel operator at step 78. For example, ECM 32 may consider the abnormal or malfunction/fault condition no longer present at step 78 when any one of the following actions occurs:

1. the operator takes appropriate corrective action to remedy the malfunction/fault;

2. the malfunction/fault is corrected and is no longer displayed on screen 38;

3. the operator activates some type of switch or function key to acknowledge that the displayed malfunction/fault condition has been observed.

Such operator intervention could be inputted to the operator interface display 34, or to some other operator input device which is coupled to ECM 32 for inputting appropriate signals thereto. Other programming and logic alternatives can likewise be inputted at step 78 which will allow ECM 32 to loop back to step 70. The predetermined time delay established at step 76 can vary depending upon the severity of the particular malfunction/fault condition being displayed, or other factors.

If, at step 78, ECM 32 determines that the fault condition is no longer present, ECM 32 will return the brightness of screen 38 to its night-time viewing mode at step 81 and ECM 32 will thereafter loop back to step 70 and repeat the software routine.

FIG. 4 illustrates another embodiment of the present invention wherein control loop 82 represents one series of operating steps which could be inserted after step 74 of control loop 66 and replace steps 76, 78 and 80. Referring to FIG. 4, once ECM 32 has determined that an abnormal or fault condition is present on interface display screen 38, ECM 32 will wait a first predetermined period of time at step 84 before proceeding to step 86. At step 86, ECM 32 will again look to see if the undesirable condition is still present. As previously explained, if the abnormal or fault condition is no longer present, or if the undesirable condition has been acknowledged by some type of predetermined operator intervention, ECM 32 will return the brightness of screen 38 to its night-time viewing mode at step 87, it will loop back to step 70 of control loop 66, and the software routine will again be repeated. On the other hand, if the undesirable condition is still present at step 86, ECM 32 will brighten the display screen 38 to a first level of brightness at step 88 and proceed to step 90 where it will again wait a second predetermined period of time before proceeding to step 92.

If, at step 92, the fault condition is no longer present, ECM 32 will again loop back to step 87 and the software routine will again be repeated starting at step 70. On the other hand, if the fault condition is still present and no predetermined operator intervention as previously explained has been recognized by ECM 32 at step 92, ECM 32 will proceed to step 94 and will again brighten the display screen 38 to a second level of brightness before proceeding to step 96. At step 96, ECM 32 will again wait a third predetermined period of time before proceeding to step 98. At step 98, ECM 32 will again look to see if the fault condition is still present, or if some type of predetermined operator intervention has occurred. If, at step 98, the fault condition is still present and no predetermined operator intervention has been recognized by ECM 32, ECM 32 will loop back to step 96 and steps 96 and 98 will be continuously repeated until some type of predetermined operator intervention has occurred, or until the fault condition is no longer present. At this point, ECM 32 will again loop back to steps 87 and 70 and the present software routine will again be repeated.

With respect to control loop 82, it is recognized and anticipated that any plurality of brightness stages can be incorporated into the software programming depending upon the particular caution/warning system being utilized and/or depending upon the particular application. It is also recognized and anticipated that the respective time delays between the successive brightening of the display screen 38 can likewise vary, including variants between the respective time delays for the same fault condition. This sequence of successively increasing the brightness and intensity of the screen 38 can be repeated any plurality of times until a maximum brightness and intensity level is achieved. It is also recognized that the brightness and intensity of the screen 38 can be eventually increased to the same illumination level associated with the day-time viewing mode, or an even higher illumination level, if such illumination is necessary for a particular application.

The present caution/warning system therefore provides an additional warning mechanism, as well as an additional level of safety, to alert the operator of a particular vehicle/vessel of an abnormal or malfunction/fault condition when the caution/warning system is operating in a night-time viewing mode.

Industrial Applicability

As described herein, the present caution/warning system has particular utility in a wide variety of engine-powered vehicles including ground vehicles, aircraft and marine vessels wherein some type of monitoring and caution/warning system is utilized to detect the presence of various undesirable operating conditions associated with that particular vehicle or marine vessel.

It is recognized and anticipated that instead of increasing the brightness and intensity of the operator interface display screen 38, the operating steps of control loops 66 and 82 can be modified so as to increase the brightness and intensity of a particular instrument or gauge evidencing the abnormal or malfunction/fault condition, such as any one of the gauges 40, 46, 48, 50 and/or 52 illustrated in FIG. 2, or ECM 32 could be programmed to increase the brightness and intensity of a particular caution/warning light or other indicator such as indicator means 62 illustrated in FIG. 1. Other variations in this regard are likewise anticipated and recognized.

It is also recognized that other variations to the operating steps depicted in flow charts 66 and 82 could likewise be made without departing from the sprit and scope of the present invention. In particular, steps could be added and some steps could be eliminated. All such variations are intended to be covered by the present invention. Still further, it is also recognized that in most applications a caution/warning system including ECM 32 will include a variety of other components such as other switches, solenoids, relays, indicators, sensors and other control apparatus.

As is evident from the forgoing description, certain aspects of the present invention are not limited to the particular details of the examples illustrated herein, particularly the particular caution/warning system illustrated in FIG. 1 as well as the particular screen display illustrated in FIG. 2, and it is therefore contemplated that other modifications and applications will occur to those skilled in the art. It is accordingly intended that the claims shall cover all such modifications and applications that do not depart from the sprit and scope of the present invention.

Other aspects, objects and advantages of the present invention can be obtained from a study of the drawings, the disclosure and the appended claims.

What is claimed is:

1. A system for indicating warning conditions associated with certain parameters related to the operation of a vehicle, said system comprising:

at least one sensor for sensing a certain parameter associated with the operation of the vehicle, said sensor sensing a plurality of levels of said parameter and responsively producing a plurality of sensor signals indicative of the different levels of said parameter;

control means coupled to said at least one sensor for receiving signals therefrom, said control means being operable to receive signals from said at least one sensor indicative of the level of said sensed parameter being equal to a predetermined level; and display means for displaying a warning condition associated with the sensed parameter when the level of said sensed parameter is equal to said predetermined level, said display means being operable at a first illumination level during day-time operations and at a second illumination level during night-time operations, said first illumination level being greater than said second illumination level;

said control means being operable to display a warning condition associated with the sensed parameter on said display means when said control means receives a signal from said at least one sensor indicative of the level of said sensed parameter being equal to said predetermined level;

said control means being further operable to increase the illumination level of said display means when a warning condition is displayed thereon and when said display means is being operated at said second illumination level.

2. The system, as set forth in claim 1, wherein the increase in the illumination level of said display means occurs after expiration of a predetermined period of time, said predetermined period of time being measured from the initial display of said warning condition.

3. The system, as set forth in claim 1, wherein the illumination level of said display means is incrementally increased a plurality of times from said second illumination level to a third illumination level, each incremental increase of said illumination level occurring after expiration of a predetermined period of time, each predetermined period of time being measured from the last incremental increase of said illumination level.

4. The system, as set forth in claim 3, wherein said third illumination level is equal to said first illumination level.

5. The system, as set forth in claim 3, wherein each predetermined period of time between each incremental increase of said illumination level is substantially the same.

6. The system, as set forth in claim 5, wherein at least some of said predetermined periods of time between incremental increases of said illumination level are of a different time duration.

7. The system, as set forth in claim 1, wherein the vehicle is a marine vessel.

8. The system, as set forth in claim 1, wherein said display means includes an LCD screen.

9. The system, as set forth in claim 1, wherein said display means includes gauge means for indicating a level of the sensed parameter.

10. The system, as set forth in claim 1, wherein said display means includes a warning light.

11. A system for indicating warning conditions associated with certain parameters related to the operation of a vehicle, said system comprising:

at least one sensor for sensing a certain parameter associated with the operation of the vehicle, said sensor sensing a plurality of levels of said parameter and responsively producing a plurality of sensor signals indicative of the different levels of said parameter;

control means coupled to said at least one sensor for receiving signals therefrom, said control means being operable to receive signals from said at least one sensor indicative of the level of said sensed parameter being equal to a predetermined level; and indicator means for displaying a warning condition associated with the sensed parameter when the level of said sensed parameter is equal to said predetermined level, said indicator means being operable at a first illumination level during day-time operations and at a second illumination level during night-time operations, said first illumination level being greater than said second illumination level;

said control means being operable to illuminate said indicator means when said control means receives a signal from said at least one sensor indicative of the level of said sensed parameter being equal to said predetermined level;

said control means being further operable to increase the illumination level of said indicator means when said indicator means is being operated at said second illumination level.

12. The system, as set forth in claim 11, wherein said indicator means includes gauge means for indicating a level of the sensed parameter, said gauge means including a portion thereof operable for displaying a warning condition associated with the sensed parameter, said gauge portion being illuminated when said control means receives a signal from said at least one sensor indicative of the level of said sensed parameter being equal to said predetermined level.

13. The system, as set forth in claim 12, wherein the portion of said gauge means operable for displaying a warning condition includes a digital display of the sensed parameter, and means for displaying the sensed parameter in a digital form on said digital display when said control means receives a signal from said at least one sensor indicative of the level of said sensed parameter being equal to said predetermined level, said control means being operable to increase the illumination level of said digital display when said indicator means is being operated at said second illumination level.

14. The system, as set forth in claim 11, wherein said indicator means includes a warning light.

15. The system, as set forth in claim 11, wherein said indicator means includes an LCD screen.

16. The system, as set forth in claim 11, further including an operator interface device for enabling the operator to take a predetermined action in response to illumination of said indicator means, said control means being coupled to said operator interface device for receiving signals therefrom, said control means being further operable to return the illumination level of said indicator means to said second illumination level when said control means receives a signal from said operator interface device indicative of the predetermined action having been taken by the operator in response to the increased illumination level of said indicator means.

17. An apparatus for indicating abnormal conditions associated with a plurality of sensed parameters related to the operation of a vehicle or marine vessel, said apparatus comprising:

a plurality of sensors for sensing a plurality of parameter levels and responsively producing a plurality of sensor signals indicative of the different levels of said parameters;

an electronic controller coupled to said plurality of sensors for receiving signals therefrom, said controller being operable to receive a signal from each of said sensors indicative of the level of each of said sensed parameters being equal to a predetermined level; and display means coupled to said controller for displaying the abnormal conditions associated with said sensed parameters when the level of each of said sensed parameters is equal to its corresponding predetermined level, said display means being operable at a first illumination level during day-time operations and at a second illumination level during night-time operations, said first illumination level being greater than said second illumination level;

said controller being operable to display on said display means a warning to the operator of the vehicle/marine vessel indicative of an abnormal condition associated with any one of said sensed parameters when said controller receives a signal from any one of said sensors indicative of the level of said sensed parameter being equal to its corresponding predetermined level;

said controller being further operable to increase the illumination level of the warning given to the operator on said display means when said display means is being operated at said second illumination level.

18. The apparatus, as set forth in claim 17, wherein the increase in the illumination level of said warning on said display means occurs after expiration of a predetermined period of time, said predetermined period of time being measured from the initial display of said warning.

19. The apparatus, as set forth in claim 17, wherein the illumination level of said warning displayed on said display means is incrementally increased from said second illumination level to a third illumination level, each incremental increase of said illumination level occurring after expiration of a predetermined period of time, each predetermined period of time being measured from the last incremental increase of said illumination level.

20. The apparatus, as set forth in claim 17, wherein said display means includes a plurality of gauges for indicating a level of the sensed parameters, each of said gauges including a portion thereof operable for displaying a warning to the operator associated with the sensed parameter, said gauge portion being illuminated in response to an abnormal condition for a particular sensed parameter.

21. The apparatus, as set forth in claim 20, wherein the entire gauge is illuminated in response to an abnormal condition for the particular sensed parameter.

22. The apparatus, as set forth in claim 17, wherein the warning given to the operator on said display means includes a warning light.

23. The apparatus, as set forth in claim 17, wherein the illumination level of the entire display means is increased when said controller receives a signal from any one of said sensors indicative of an abnormal condition for that particular sensed parameter.

24. The apparatus, as set forth in claim 17, further including an operator interface device for enabling the operator to take a predetermined action in response to the display of a warning on said display means, said controller being coupled to said operator interface device for receiving signals therefrom, said controller being further operable to return the illumination level of the warning on said display means to said second illumination level when said controller receives a signal from said operator interface device indicative of the predetermined action having been taken by the operator in response to the increased illumination level of the warning on said display means.

\* \* \* \* \*